May 12, 1970          J. A. SOPER          3,512,074
GENERATOR HAVING TWO FIELD WINDINGS AND CONTROL SYSTEM THEREFOR
Original Filed Oct. 26, 1966          5 Sheets-Sheet 1
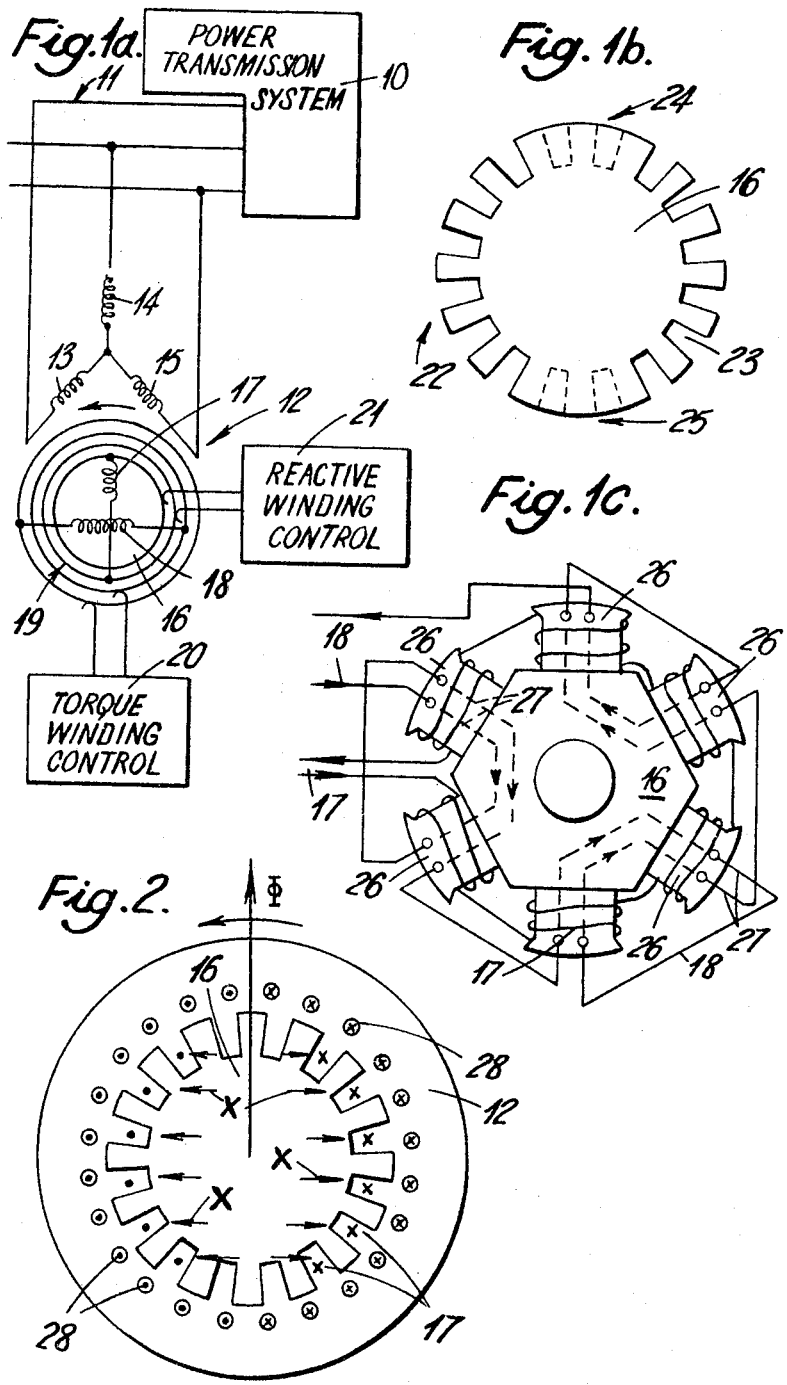

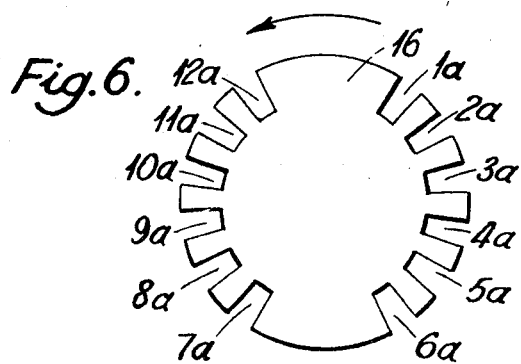
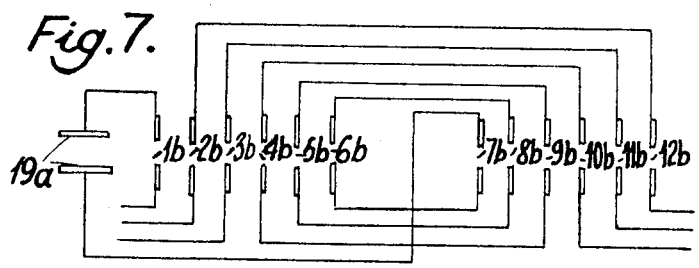
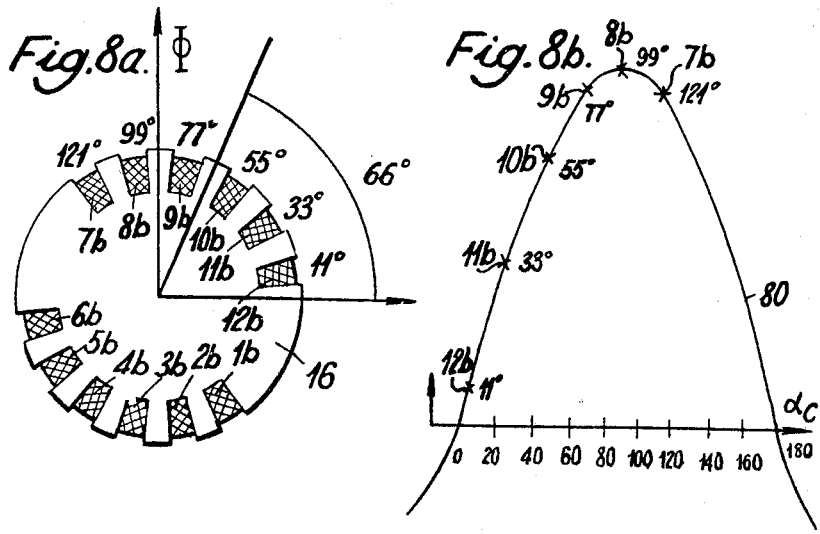

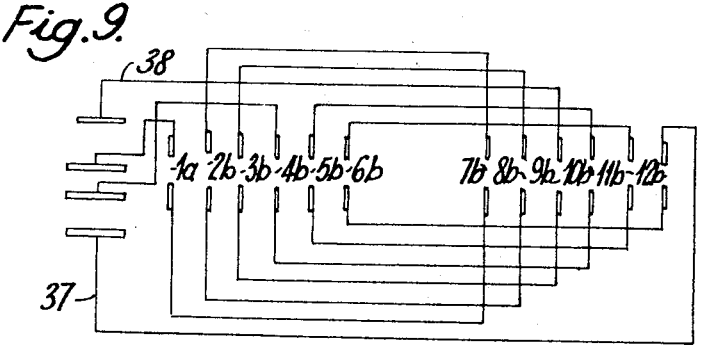
Fig. 9.
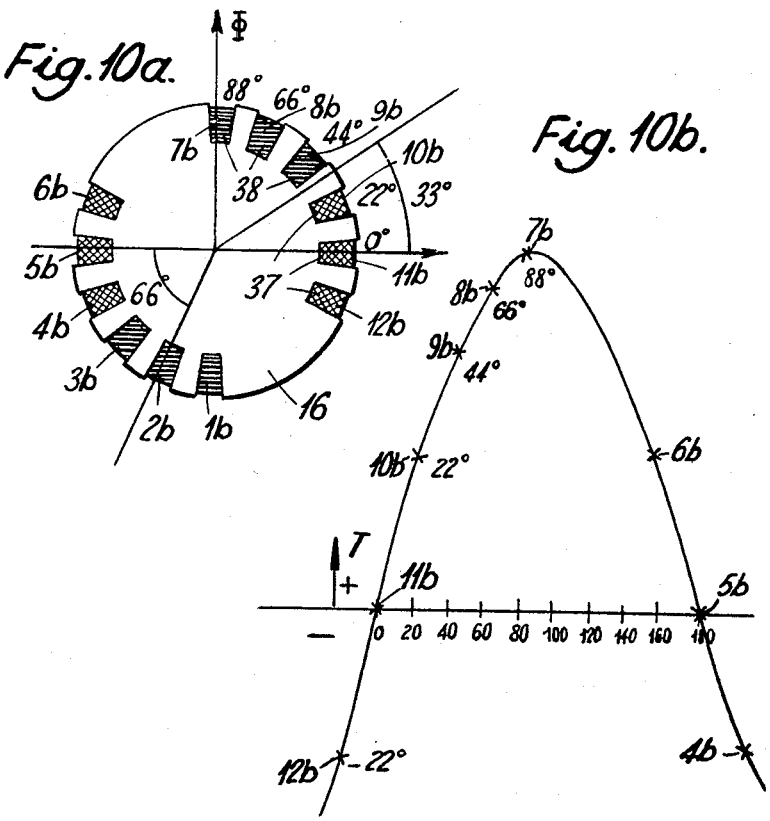
Fig. 10a.
Fig. 10b.

United States Patent Office 3,512,074
Patented May 12, 1970

3,512,074
GENERATOR HAVING TWO FIELD WINDINGS AND CONTROL SYSTEM THEREFOR
John Alexander Soper, Hemel Hempstead, England, assignor to Central Electricity Generating Board, London, England, a British body corporate
Continuation of application Ser. No. 589,619, Oct. 26, 1966. This application Jan. 29, 1969, Ser. No. 794,906
Int. Cl. H02p 9/14; H02k 23/22
U.S. Cl. 322—20    17 Claims

ABSTRACT OF THE DISCLOSURE

A synchronous alternating current machine has two rotor windings whose magnetic axes are at an angle, preferably about 60°. Current is supplied to one winding so as to maintain the other winding in a condition in which current through it produces substantially no torque on the rotor. This condition is the most favourable for the control of reactive power flowing to or from the machine's stator without introducing instability of the machine. The reactive power is thereby controllable by feeding the said other winding separately with direct current.

This application is a continuation of my prior application Ser. No. 589,619, filed October 26, 1966, and now abandoned.

Background to the invention

This invention relates to electrical machines and is more particularly concerned with improving the stability of such machines when they supply reactive current and their ability to supply reactive current. It is also concerned with enabling machines such as alternators, synchronous compensators, or synchronous motors to absorb more reactive current from a power transmission system (which phrase includes a D.C. link or the inverting and rectifying equipment associated therewith).

One of the problems associated with electric power transmission systems is that which arises when an alternator (for example) is used to reduce the voltage in the power transmission system. Normally, the magnitude of the alternator's rotor current is reduced so as to cause a fall in the voltage throughout the transmission system, but under these circumstances the rotor must run at a high rotor angle to generate the same power. It has been found that in order to generate power with minimum excitation of the rotor, the machine must run at a rotor angle of approximately 75° (that is to say the angle between the rotor's magnetic axis and the stator's rotating field is 75°), and the machine is close to the point of theoretical instability at 90° of rotor angle. In this condition, the rotor's current is about half its rated value and the machine cannot absorb reactive current up to the maximum rated value.

A similar problem may be considered more generally and in relation also to synchronous compensators. In order that an alternating current machine may generate the maximum quantity of reactive power (VAr) or that such a machine may absorb the maximum quantity of reactive current from a power transmission system, it is necessary for the magnetic axis of the rotor to be aligned with the instantaneous magnetic axis of the rotating field produced by the stator of the machine. As is well known however, under these conditions the rotor can produce no torque and is in an unstable condition (if negatively excited) in which the torque of the rotor's prime mover is unbalanced and "pole slipping" occurs. In order to produce the torque necessary to balance the torque provided by the prime mover rotating the rotor, the rotor must run at a considerable angle with respect to the rotating field and in this condition the ability of the machine to generate or absorb reactive current is substantially reduced. The crux of the problem lies in the inability of a rotor winding to be simultaneously in a condition producing the maximum reactive effect while at the same time producing the torque necessary to maintain the rotor's position with respect to the stator's rotating field.

Brief summary of the invention

The present invention is directed at a machine, a system, and a method of operation particularly suitable for reducing the problems mentioned hereinbefore. According to the invention an alternating current machine has a stator coupled to a power transmission system. The machine's rotor has two windings which are arranged for feeding separately with direct current. The magnetic axes of the two windings are different. Orthogonal windings may be adopted but practice has shown that an angle of about 60° between the windings gives best results. One winding is substantially wholly concerned with the maintenance of the rotor's postion with respect to the rotatinug field of the stator. The second winding is concerned with the control of the reactive component of the power fed to or absorbed from the power transmission system.

The said first winding would be primarily concerned with the production of the torque necessary to maintain the power output of the machine. The second winding however, may be continuously run at or near 0° of rotor angle (that is to say in a position producing substantially no torque), where it has maximum reactive effect on the machine. Current may be supplied to the first winding so as to hold the first winding at a fixed relative angle to the rotating field and to maintain the second winding at the desired rotor angle which is preferably 0° but may be up to ±10° or even higher in certain circumstances. The "true" rotor angle of such a machine will be approximately constant at the mean rotor angle of the two windings and since this angle between the windings can be a maximum of 90° electrical, it will be seen that the "true" rotor angle will never be greater than 45°. This represents a substantial improvement over 75° typical of previous machines working in a similar mode. The second winding may have reactive control over the machine far beyond that which a single rotor winding could achieve. For example, negative current can be applied to the second winding without altering the rotor's angular position with respect to the rotating field (since this winding is in a position producing no torque) and therefore the full reactive capability of the machine is available up to the maximum rated stator current for leading reactive current, as well as for lagging reactive currents (which are obtained by over-exciting the second winding with normal positive current). At the same time it will be seen that any change in the current fed to the second winding does not alter the rotor's angular position with respect to the rotating field and accordingly the ability of the machine to supply or absorb reactive current is increased without adversely affecting the stability of the machine.

It would be convenient to arrange the two windings so that either would be capable of developing enough torque to maintain full power output of the machine in the event of failure of one of the windings or its supply. Under these conditions, the ability of the machine to control reactive current independently of power would be lost but the machine can still function adequately to generate wattful power.

In a convenient form of the invention, the two windings are such that when they are energised they produce magneto-motive forces orthogonal to each other and to the axis of the rotor. Such a construction is conveniently only applicable to salient pole machines since the provision of a winding orthogonal to the normal rotor winding would necessitate in the case of a wound rotor machine the provision of extra pole slots which for cylindrical rotor machines is undesirable. The form of the invention having windings producing orthogonal M.M.F.'s is particularly suitable for certain synchronous compensators hydro-turbine alternators and synchronous motors having a salient pole rotor. Such machines may be run under excited in order to reduce the voltage of a transmission system. In this mode of operation, the alternators and compensators in the system are supplying currents to charge cable and overhead lines which currents exceed the magnetising current taken by the load when the load is small. The reactive absorbing capability of such machines would increase if negative rotor currents could be applied to the machine. Under these conditions pole slipping may easily occur with conventional machines and one purpose of the present invention is to reduce the danger of pole slipping when negative rotor current is applied to the rotor of such machines. The control of the rotor torque is by means of the first winding which may be placed in the most effective position within the magnetic system of the machine to produce torque whereby this winding may be used to set the second winding in the most effective position to control the reactive output of the machine without itself producing torque. With the present invention in all its forms the torque and reactive requirements of the machine are controlled by totally separate windings and control circuits, and thus quite generally the control is improved. This has important applications in present day high voltage transmission systems where it is necessary to absorb large amounts of reactive current or produce reactive current to alter the voltage of the transmission system. The enormous quantities of power now fed by transmission systems to its various loads can be extremely dangerous to handle if the system goes out of control and one of the advantages of the present invention is that it increases the degree of control that may be exerted over machines while yet increasing their ability to control the voltage of a transmission system.

In a preferred embodiment, the two windings are disposed on the rotor at relative angles of less than 90°, typically about 60°. This construction is particularly suitable for cylindrical rotor machines and it is possible as will be hereinafter explained, to modify the windings on the rotor in a fairly simple manner to utilise existing rotor slots for the accommodation of two separate windings rather than a single winding as hitherto without adversely affecting the output of the machine. The present invention therefore is applicable to the modification of existing machines as well as the construction of new machines.

The magnitude of the direct current through the first and second windings could theoretically be controlled manually. Such a mode of operation is not appropriate for high voltage power transmission systems and it would usually be necessary to control the current through said first winding in accordance with the angle that the rotor's magnetic axis makes at any instant with the stator's rotating field, and the current through the second winding in accordance with a desired change in voltage in the transmission system. Conveniently, therefore, there is means responding to the phase relation between the rotor position and alternating voltage at stator terminals to control the magnitude and polarity of the direct current through the first winding so as to provide torque on the rotor in a direction and of a magnitude tending to maintain constant phase relation between the rotor position and terminal's alternating voltage. This control would maintain the rotor's position and may comprise a comparator comparing the phase relation between the alternating voltage at the stator's terminals and the alternating voltage produced by a pilot generator driven by or coupled to the rotor's shaft, to produce a direct voltage proportional to the phase difference between the two voltages. This direct voltage may conveniently be fed to an amplifier and a control network to produce a correspondingly larger direct current to be fed through the first rotor winding. Thus the rotor current, as far as the first winding is concerned, may be varied in accordance with the torque necessary to maintain the rotor's position with respect to the rotating field produced by the stator.

In like manner, there may be means responsive to the amplitude of the alternating voltage at the stator's terminals to produce a direct control signal proportional to the difference between the terminal voltage and a reference, which may be a manual reference selected in accordance with a new voltage required for the transmission system. This control signal may be amplified and used to control a correspondingly larger direct control signal which varies in proportion and is fed to the second winding of the machine. Thus the current fed to the second winding would have a magnitude varying in accordance with a change in voltage required in the transmission system. It may be that the voltage should be reduced in which case the current fed to the windings would probably be negative that is to say in a direction such as to produce in conventional machines a small demagnetisation of the machine. As will be explained more particularly hereinafter, the use of two rotor windings may avoid the demagnetisation of the rotor when the machine is reducing the voltage in the transmission system, i.e. when increasing power output while running at a load angle greater than 90°.

Brief description of the drawings

FIGS. 1a and 1b illustrate diagrammatically a simple embodiment of the invention;

FIG. 1c shows a salient pole rotor;

FIGS. 2, 3 and 4 are diagrams illustrating the operation of the apparatus of FIGS. 1a and 1b;

FIG. 6 illustrates a conventional wound rotor;

FIG. 7 illustrates a conventional concentric winding for the rotor of FIG. 6;

FIG. 8a is a diagram showing the rotor of FIG. 6 carrying the winding of FIG. 7;

FIG. 8b is a graph illustrating the forces on the rotor winding of FIG. 8a;

FIG. 9 illustrates a "divided" rotor winding for the rotor of FIG. 6;

FIG. 10a illustrates the rotor of FIG. 6 carrying the winding of FIG. 9;

FIG. 10b is a graph showing the forces on the rotor winding of FIG. 10a; and

Detailed description of the preferred embodiments

Figure 3:
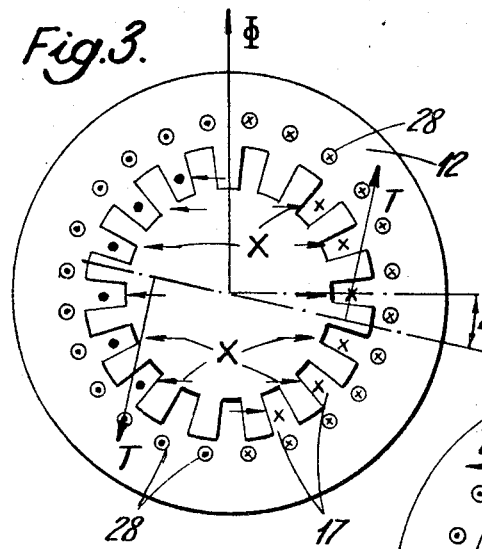

Reference will first be made to FIGS. 1–4 which illustrate diagrammatically the invention as applied to a synchronous compensator arranged to absorb VAr from a transmission system. FIG. 1a includes a three phase power transmission system illustrated diagrammatically at 10 and having three bus bars 11 for the three phases. Connected to the bus bars is an alternator 12 being used as synchronous compensator. The machine 12 has 3 conventional distributed stator windings illustrated diagrammatically at 13, 14, 15 connected to a respective one of the bus bars 11. On the rotor 16 is a first winding 17 energised through an appropriate pair of slip rings 19. Also on the rotor is an orthogonal winding 18 which will be discussed in more detail hereinafter.

FIG. 1b illustrates diagrammatically a conventional wound rotor. The rotor 16 has conventional rotor slots 22 and 23 which carry the coil sides of the winding 17. Illustrated in ghost at 24 and 25 are further slots which will carry the winding 18. It will be seen that the magnetic axis of the field produced by a winding in slots 22 and 23 is towards the top of the drawing whereas the axis of the field produced by a winding disposed in slots 24 and 25 would be parallel to the top of the drawing. It will have been noted from the above that the provision of the extra slots 24 and 25 is undesirable if the machine is one having a large power output. In general, it is undesirable to reduce the amount of iron in the machine. The short circuit ratio of a machine is defined as the ratio of the rotor current for producing normal open circuit voltage divided by the rotor current necessary to produce rated stator current with the stator terminals short circuited. It is a measure of the amount of iron in the magnetic circuit of the machine and the current carrying capacity of the stator windings. The lower the short circuit ratio, the less iron in the machine and/or the more the windings are cooled, thereby increasing the MVAr output from a given weight of iron and copper. A machine having a low short circuit ratio runs at a higher rotor angle for a given MW/MVAr output and is restricted in its capacity to provide leading MVAr compared to a machine having a higher short circuit ratio. It is therefore more vulnerable to instability. If a salient pole machine is used in place of the cylindrical rotor machine illustrated in FIGS. 1a and 1b, the rotor illustrated in FIG. 1c may be used. This has a rotor 16 with a plurality of salient poles 26 and having a main rotor winding 17 disposed thereon. The winding 18 is provided by connecting together the pole face starting winding bars of armortisseurs 27.

Figure 4:
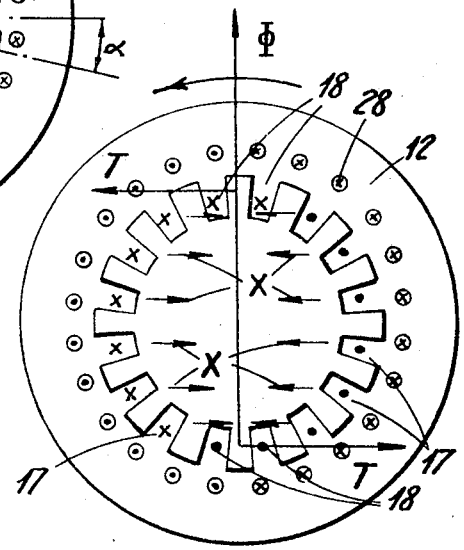

Reference will now be made to FIGS. 2, 3 and 4 to explain the operation of the system of FIG. 1a. FIG. 2 illustrates the machine of FIG. 1a used to absorb MVAr from the transmission system 10. It should be explained that an alternator is basically a rotating magnet within a stationary winding. The current circulating within the stator winding, when the alternator is connected to the transmission system 10, sets up a magnetic system in the stator. The stator's magnetic axis ($\Phi$) is in line with the rotor's magnetic axis on no load and behind the rotor axis when the alternator provides generating power. The rotor angle when generating is normally between 0° and 90° depending on the torque, the electrical power developed by the alternator and the strength of the magnetic system. FIG. 2 shows the alternator's magnetic system, with no generation or motoring power, with reactive current taken by the stator winding 28 (constituting windings 13, 14, 15) in a direction for cable charging. The losses in a driving turbine and the alternator supplied by the power generated in the turbine and in this condition the alternator is under-excited. That is, the rotor current is less than that required to produce normal alternator voltage when the alternator is running with a main circuit breaker open. The forces on the rotor conductors lying in the main alternator flux are shown by the arrows X.

These forces are balanced and do not produce a resultant force couple. FIG. 3 shows the effect of the losses in the alternator and turbine in producing a small loss angle of approximately 2° at no normal open circuit excitation, which increases to 30° or more when the rotor current is reduced to zero. The alternator's main flux produces forces X on the rotor conductors as shown. These forces are unbalanced and produce a small force couple T as shown. At zero rotor current the rotor is magnetised by the stator current in the same way as an induction motor. If the alternator's rotor current is then increased in a negative sense the small rotor angle will produce a pole slipping torque on the rotor, which torque will cause the rotor to move back to the next pole (by 180° electrical) change its mode of operation from absorbing reactive current and boost the alternator's voltage. If the loss torque is produced by another winding on the rotor at 90° electrical to the main rotor winding 17, the main rotor winding can be positioned and held in a zero torque condition. Negative excitation can then be applied to the rotor in the sense to demagnetise the alternator. The effect of this will be to draw more reactive stator current into the alternator to counterbalance the negative rotor excitation. By this means the alternator can be induced to absorb rated stator current continuously even when the rotor is negatively excited.

FIG. 4 shows how the loss couple of force is transferred to the winding 18 so that the main rotor winding polarity can be reversed without producing torque which would give a pole slip. In FIG. 4, it will be seen that the torque produced by the winding 18 repositions the rotor such that the main winding 17 is at 0° with respect to the stators field. In this condition all the torque necessary to balance the losses in the machine are produced by the winding 18 and control over the reactive current absorbed by the stator is maintained by means of the winding 17. It will be apparent that the winding 18 is disposed in the slots 24 and 25 of FIG. 1b. The system shown in FIG. 1a includes a torque winding control 20 providing via appropriate slip rings 19 direct current to the winding 18 in accordance with the torque required to balance the losses and a reactive winding control 21 supplying positive or negative current to the winding 17, in accordance with the reactive current to be supplied to or absorbed from the system 10. The functions of the two windings have been entirely separated; the reactive winding produces substantially no torque and thus does not affect the position of the rotor with respect to the stator's rotating field. It does not therefore affect the stability of the machine. This condition is specific to a rotor's reactive control winding running at 0° of rotor angle. In practice it is not necessary to run the rotor at precisely this angle and it is possible to run at ±10° or at greater angles. Under these conditions the winding 17 does have some effect on the torque produced by the machine and may result in an undesirable reduction in the effectiveness of the torque winding control if the machine is generating power but may be necessary to control the rotor's position at a low load.

The above has been a description of a simple form of the invention applied to a machine having "orthogonal" windings. More generally however the invention may be applied to a rotor having a "divided winding" in which the same number of slots in the rotor is occupied by coil sides as before, but the single rotor winding is divided into two separate sections to form said first and second windings. The functions of the two sections are substantially the same as before but the analysis of a machine incorporating them is complex.

Figure 5:
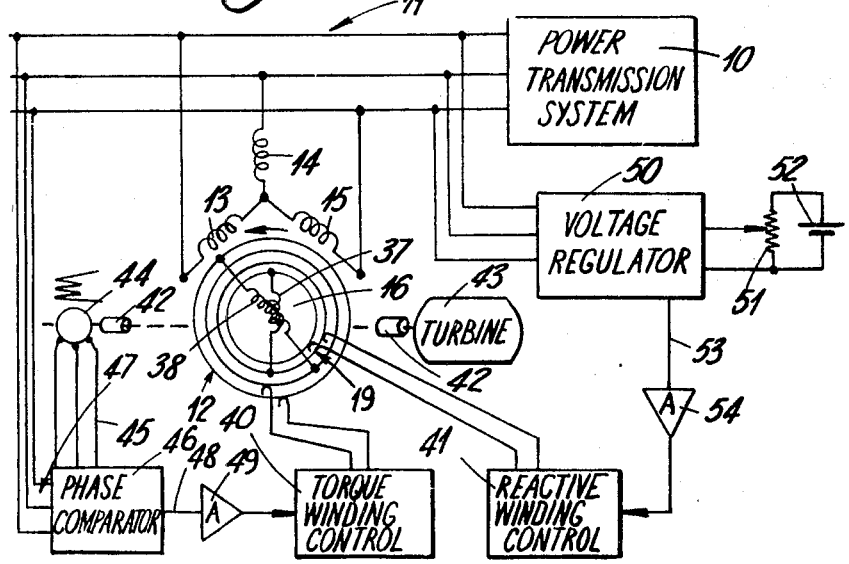
FIG. 5 illustrates diagrammatically a more complex embodiment of the invention.

FIG. 5 and the remaining figures illustrate the "divided winding" technique. In FIG. 5 there is shown as before the power transmission system having bus bars 11 to which are connected the stator windings 13, 14 and 15 of the alternator 12. The rotor 16 of the alternator carries windings 37 and 38 disposed at an angle of about 60° to each other. How they are disposed on the rotor will be described hereinafter. The winding 38 is controlled as before by the torque winding control 40 and the winding 37 is controlled by the reactive winding control 41. FIG. 5 also includes a control circuit for controlling the magnitude and sense of the currents through the rotor windings. The rotor shaft 42, which is driven by turbine 43, carries a pilot alternator 44 whose output terminals are connected by the lines 45 to one input of the three phase comparator 46. The comparator 46 is also fed by the lines 47 coupled to the bus bars 11. The phase comparator 46 may be any comparator of known type arranged to produce on an output line 48 a direct voltage whose magnitude is proportional to the phase difference between the alternating voltage at the bus bars 11 and the alternating voltage produced by the alternator 44. It will be apparent that the instantaneous phase of the alternator 44 will depend on the actual instantaneous position of the rotor 16 of the machine 12. Any difference between the position of the rotor 12 and the rotating field produced in the stator coils 13, 14 and 15 will be accompanied by a corresponding phase difference between the signals on the lines 45 and 47. The phase comparator 46 produces a direct current output signal on line 48, which output signal is amplified by the amplifier 49 and fed to the torque winding control 40. The purpose of this control is merely to amplify the direct current signal to a value suitable for injection to the rotor winding 38 of the machine 12. It will be apparent that the signal produced by the comparator will normally be of the order of milliamps whereas the torque winding may require several amps of current. The controller 40 may conveniently comprise any suitable direct current amplifier such as an amplidyne, a magnetic amplifier arrangement, or a thyristor control circuit. Its particular construction is not essential to the present invention and many ways of constructing a suitable amplifier will be apparent to those skilled in the art of power engineering.

The control circuit immediately described above functions to increase the value of the current fed through the first winding 38 as the angle between the field produced by the stator and the rotor's magnetic axis increases.

Coupled to the bus bars 11 are the inputs of an automatic voltage regulator 50; this is also a device known in the art and is arranged to compare the voltage between the bus bars (i.e. the stator's terminal voltage), suitably rectified, with a direct voltage obtained for example from a manually operated potentiometer 51 energised from a D.C. source 52 to produce on output line 53 a direct voltage signal whose magnitude and polarity accord with the difference between the amplitudes of the system voltage and the reference voltage set by the potentiometer 51. The voltage on line 53 is amplified by the amplifier 54 and fed to the reactive or second winding controller 41. Since this controller may be required to produce both positive and negative currents it is possible that a slightly more complicated version of controller 40 would be required. In like manner, however, it produces a direct current output whose magnitude is proportional to the magnitude of the signal on line 53; the polarity of the direct current output from controller 41 is positive or negative according to whether the system voltage is below or above the signal used as a reference in comparator 50. Accordingly, the reactive winding 37 is fed with current whose magnitude and sense enables the stator to provide reactive current at a leading or lagging power factor.

The actual construction of the rotor will now be discussed with reference to FIGS. 6, 7, 8, 9 and 10. FIG. 6 shows in diagrammatic form a cylindrical rotor 16 having pole slots 1a to 6a to accommodate one side of each coil and slots 7a to 12a to accommodate the other side of the coil. FIG. 7 shows a normal concentric rotor winding fed from the slip rings 19a, the numerals 1b to 12b indicating those coils sides accommodated by corresponding slots 1a to 12a respectively. In FIG. 8a is shown the rotor of FIG. 6 carrying the winding of FIG. 7. Appended to each slot is an angle whose meaning will now be explained. When an alternator's rotor is at a high angle or the alternator's output is at a leading power factor, the magnetic field of the stator across the air gap and through the rotor is maintained in form by the stator's M.M.F. and not by the rotor. The alternator's field is assumed to be maintained constant in form regardless of the current in the rotor or the rotor angle and it is assumed that any change in either will produce a change in torque on the rotor and an alteration in the stator's reactive current component to preserve the form of the magnetic field. Under these circumstances the effect of rotor current on the alternator can be resolved in the following manner. The lines of magnetic flux across the alternator can be regarded as being constant in density across the alternator and sinusoidal in the air gap. If a coil carries the same current no matter what its position is in the stator's field, the forces exerted on the conductors are always in the same direction relative to the flux and are of the same magnitude. However, when the plane embracing the two sides of a coil is transverse the stator field, the forces exerted on the two sides of the coil are equal and opposite to produce no rotational force couple.

It will be recalled that this was clear from FIG. 2 previously described. However, when the plane of the coil sides is aligned with the magnetic field produced by the stator, a rotational force couple is produced. Generally, the force couple is proportional to the sine of the coil angle $\alpha_c$ to its 0° torque position at right angles to the stator flux. In FIG. 8b is shown a typical torque angle diagram for the rotor of FIG. 8a. The curve 80 is a sinusoid and indicates the magnitude of the torque on a coil side versus the angle that the plane of the particular coil makes with the stator's flux axis. The crosses on the curve 80 correspond to the torque produced by the coils in the rotor of FIG. 8a when the rotor is running at a typical angle of 66° to the rotating field. In this figure (and FIG. 10b) the numbers of each coil side has been appended to the cross which shows that coil sides position on the torque/angle curve. The direction of the rotating field at any instant is shown by the arrow $\Phi$ in FIG. 8a. It will be seen from FIG. 8b that all the coil sides in FIG. 8a produce some torque. In FIG. 9 is shown a pair of windings for the rotor of FIG. 6 arranged to produce the "divided winding" effect that is to say to divide the rotor winding into two separate portions. The windings are shown more particularly in FIG. 10a wherein the slots bearing the winding 37 have been shown cross-hatched. It will be seen from FIG. 10a that the angle between the magnetic axes or the centres of the winding sides of these coils is approximately 66°. In FIG. 10a a divided winding rotor running at 33° is shown, with the positions of the coil sides (with positive excitation) on the torque angle diagram shown in FIG. 10b. It will be seen that all the sides of the torque winding are near the peak of the torque versus angle curve whereas the sides of the reactive winding are disposed about zero torque. It will be seen therefore that the resultant torque produced by the winding 37 is zero, whether it is positively or negatively excited, whereas substantially all the torque produced is obtained from the current through the winding 38. The current through the winding 38 can be varied quite independently of the current through the "reactive" winding 37. Therefore, the rotor of FIG. 10a can always be maintained in the position in which the coil sides 4b, 5b, 6b and 10b, 11b, 12b are centred on the position of zero torque in the diagram of FIG. 10b. This is quite impossible with the rotor of FIG. 8a. Also, the current through the winding 37 can be increased in a negative sense in order that the stator of the alternator can absorb reactive current up to the maximum rated value without any change in the position of the rotor with respect to the rotating stator field. In this case the coil sides 4b, 5b, 6b and 10b, 11b, 12b are symmetrically disposed about the 180° position of no torque.

It would be possible to use instead of the winding of FIG. 9, the well-known "fully-wound" rotor in which one of the three windings were adapted as the "reactive" winding and the other two as torque windings. The term "cylindrical" rotor as used herein includes a "fully-wound" rotor.

Figure 11:
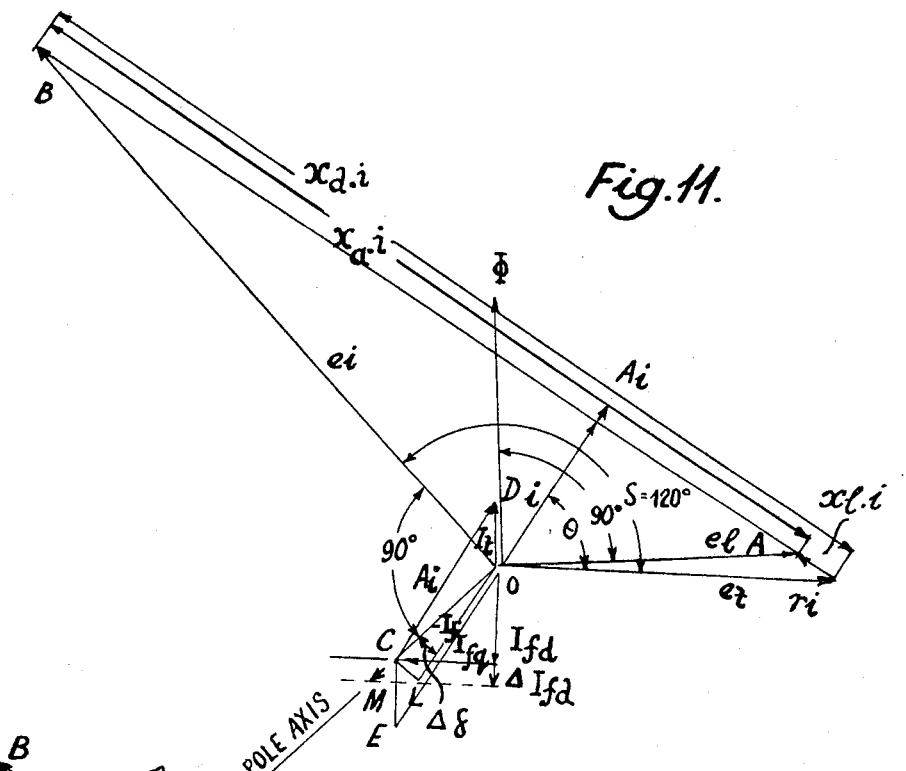
FIGS. 11 and 12 are complexor diagrams illustrating the operation of the system of FIG. 5.

The above explanation has been mainly concerned with the ability of a machine to absorb reactive power (VAr) from a power transmission system. The present invention, as hereinbefore mentioned, may increase the stablity of an alternator on load. FIG. 11 shows the complexor diagram of a conventional machine (i.e. one having a rotor wound as in FIG. 8a) and FIG. 12 shows the complexor diagram of a machine having a rotor wound in, for example, accordance with FIG. 9.

Figure 12:
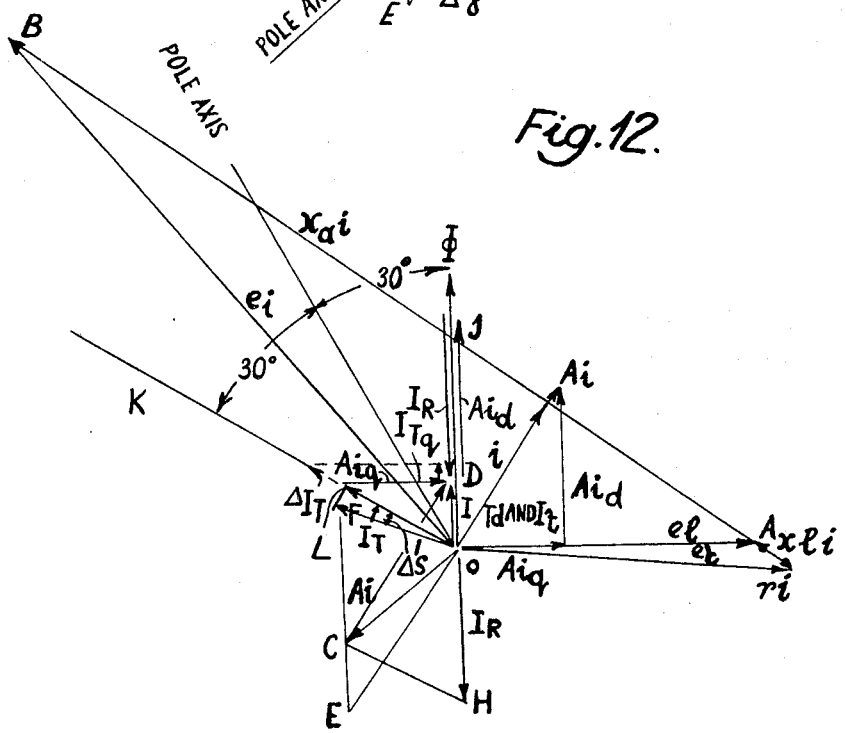

In FIGS. 11 and 12, the terms used are as follows:

$e_t$—alternator's terminal voltage;
$e_1$—alternator's air gap voltage;
$i$—armature current;
$Ai$—armature's magneto-motive force (M.M.F.);
$Ai_d$—direct axis (reactive) component of armature's M.M.F.;

$Ai_q$—quadrature (torque producing) component of armature's M.M.F.;
$I_t$—field current's M.M.F. at normal open circuit voltage;
$I_f$—field current's M.M.F.;
$e_i$—alternator's open circuit voltage that would be produced by $I_f$ without saturation in the alternator;
$X_d$—synchronous reactance;
$x_a$—armature reaction reactance;
$x_l$—armature's leakage reactance;
$\theta$—power factor angle;
$\delta$—rotor angle (i.e. angle from the no-load position of just synchronised machine);
$\alpha_c$—coil angle;
$I_R$—M.M.F. of reactive winding 37;
$I_T$—M.M.F. of torque winding 38;
$I_{Td}$—direct axis component of $I_T$;
$I_{Tq}$—quadrature component of $I_T$;
$\Phi$—air gap flux.

It should be explained that the quantities in the diagrams of FIGS. 11 and 12 combine the true vectors of flux and M.M.F. with the the pseudo-vectors of alternating voltage and current. They are direct quantities and the complexor diagrams illustrate the relative physical angles between the quantities assuming the rotor to be stationary.

In FIG. 11 the alternator's stator current $i$ leads terminal voltage $e_t$ by the power factor angle $\theta$. Upon adding armature resistance $ri$ and leakage reactance drop $x_l \cdot i$ to $e_t$ there is obtained the air gap voltage, $e_1$, which represents the voltage developed by the air gap flux $\Phi$ that leads $e_1$ by 90°. The flux $\Phi$ represents the net flux in the air gap produced by a field current $I_t$ (obtained from the open circuit saturation curve). The armature's M.M.F. $A_i$ added vectorally to the field current's M.M.F. $I_f$ acting along the pole axis produces the magnetising M.M.F. vector $I_T$. Neglecting saturation effects, $e_i$ is the open circuit voltage corresponding to the field current $I_f$ (which leads $e_1$ by 90°). The reactance drop between $e_t$ and $e_1$ is due to synchronous reactance $x_d$, which is the sum of reactance $x_a$ and $x_l$. Some modification of the M.M.F.'s is necessary to represent the action of the two rotor windings and the positions magnitude of these M.M.F.'s are shown in FIG. 12 where the angular position of the torque winding 38 lies along the line Ok, 60° in advance of $\Phi$. The point F gives a magnitude of $I_T$ which is obtained by extending $Ai_q$ from the flux axis at D to intersect the line Ok at F. The M.M.F. $I_T$, when added to $Ai_q$ produces a resultant vector $I_{Td}$ represented by Od, to which is added the magnetising component of the armature M.M.F. $Ai_d$ giving total magnetising component Oj. Negative current $I_R$ must be applied to winding 37 to give the resultant M.M.F. $I_t$ which happens to be coincident with $I_{Td}$ in FIG. 12, necessary to produce a flux $\Phi$. The resultant of the rotor's M.M.F's is Oc, which is coincident with $I_f$ in FIG. 11.

It should be explained at this stage that operation with a rotor angle of more than 90° may be essential for the production of useful power and at the same time to absorb the necessary reactive current to control the transmission voltage down to the required level. It was explained hereinbefore that the present invention permits more stable operation under conditions wherein the machine is providing reactive current or is absorbing reactive current. As will become clear shortly, the present invention also permits a greater control over the stability of the machine when it is generating useful power. It was explained above that at minimum excitation, operation close to 90° rotor angle rendered the machine unstable. At angles greater than 90° it is essential to provide some form of rotor control but it is difficult with prior machines to both control the rotor angle and to provide an increase in power output. Essentially this requires demagnetisation of the machine which produces less torque and renders the machine less stable.

In FIG. 11, an increase in power must first increase the rotor angle by an amount $\Delta\delta$ from point C to point L which results in a depression of the flux due to an increase in the demagnetising component of $I_{fd}$. There is normally an automatic voltage regulator action to increase the rotor M.M.F. to give a new stable condition at the same rotor angle, the automatic voltage regulator having some form of rotor angle controller or limiter for rotor angles greater than 75°. The new stable condition is at point M. It will be noticed from FIG. 11 that an increase in $I_{fd}$ has a component opposing to the flux $\Phi$ and accordingly it is always necessary for a conventional machine to suffer a depression of flux in order to increase the load output when running at a rotor angle greater than 90°. Although the automatic voltage regulator can be set to restore the same reactive absorption at point N after this disturbance, an increase in $I_f$ will increasingly depress the flux for greater rotor angles and power increases until stability is eventually lost.

In FIG. 12, it will be seen that the direction of the reactive current, that is to say the current through the winding 37 is opposed to the flux but the direction of current to the torque winding is only at 60° to the flux wave. An increase of power also causes a momentary flux depression as $I_T$ moves forward from point F to point L in FIG. 12 by a somewhat smaller angle but the subsequent rise of $I_T$ boosts the machine flux $\Phi$ since there is a component of $I_T$ in the direction of the flux $\Phi$. Thus an increase in load does not depress the flux $\Phi$ and the machine is more stable on load.

An increase in the reactive absorption can be made by increasing $I_R$ in a negative direction without interfering with the torque, whereas a conventional rotor control must first reduce $I_f$ so that the rotor angle advances to a new position, then increase $I_f$ when beyond 90° to absorb the kinetic energy of the rotor motion and maintain the same torque as before.

It will be appreciated by those skilled in the art that various modifications may be made to the above described method and apparatus without departing from the spirit of the invention defined in the claims that follow.

I claim:
1. A method of controlling the reactive current passing between a power transmission system and an alternating current machine of which the stator terminals are coupled to the system and which has a rotor carrying first and second windings of which the magnetic axes are in different directions, said method comprising supplying direct current to the first winding and thereby providing substantially all the torque required to maintain the rotor in a synchronous condition in which current flowing through the second winding can produce substantially no torque on the rotor, and further comprising supplying direct current to the said second winding to control the said reactive current.

2. A method as set forth in claim 1 in which the two windings have magnetic axes that are substantially less than 90° electrical apart but substantially more than 0° electrical apart.

3. A method as set forth in claim 2 in which the said machine is an alternator and in which the said magnetic axes are disposed at an angle of about 60° to each other.

4. A method as set forth in claim 1 in which the said magnetic axes are orthogonal to each other.

5. In a synchronous alternating current machine having a stator, and a rotor, a rotor winding system comprising first and second windings disposed with different magnetic axes on said rotor, the angle between said axes being substantially less than 90 degrees electrical and substantially more than zero degrees electrical and direct current coupling means for each winding whereby said windings can be fed with different direct currents.

6. The structure set forth in claim 5 wherein said rotor is a cylindrical type rotor.

7. The structure set forth in claim 6 wherein said angle is of the order of 60°.

8. An alternator comprising a stator having a 3 phase winding means, a cylindrical rotor having a plurality of winding slots, a first winding disposed in a first plurality of said slots and a second winding disposed in a second plurality of said slots, said windings being thereby disposed to have magnetic axes in different directions, first slip ring means for coupling direct current to said first winding and second slip ring means for coupling direct current to said second winding.

9. An alternator as set forth in claim 8 in which the angle between said windings is substantially less than 90 degrees electrical and substantially more than zero degrees electrical.

10. The combination of an alternator as set forth in claim 8 with a 3 phase power transmission system coupled to said 3 phase winding means.

11. An alternating current machine comprising a stator winding arranged to produce a rotating field, a rotor, a first control means for supplying direct current to a first winding on said rotor to maintain said first winding in a condition producing substantially all the torque on the rotor required to maintain said rotor in a synchronous condition with respect to said field, and second control means arranged independently of said first control means for supplying direct current to a second winding on said rotor, said first and second windings being electrically separate and being disposed on the rotor to produce when energised magneto-motive forces whose axes are in different directions, whereby said second winding may be maintained in a condition producing substantially no torque on the rotor.

12. A machine as claimed in claim 11 wherein said first and second windings are arranged so that when energised they produce magneto-motive forces orthogonal to each other and to the rotor's axis.

13. A machine as claimed in claim 12 wherein said machine is of the kind having a salient pole rotor, said second winding being wound on the poles of the rotor and said first winding being formed by coupling together the pole starting bars or armortisseurs on the rotor.

14. A machine as claimed in claim 11 wherein the magnetic axes of said two windings are substantially less than 90° electrical apart but substantially greater apart than zero degrees electrical.

15. A mahcine as claimed in claim 14 wherein said rotor is of the cylindrical rotor type.

16. In an electric power transmission system, an alternating current machine comprising a stator winding arranged to produce a rotating field, a rotor, a first control means for supplying direct current to a first winding on said rotor to maintain said first winding in a condition producing substantially all the torque on the rotor required to maintain said rotor in a synchronous condition with respect to said field, and second control means, arranged independently of said first control means, for supplying direct current to a second winding on said rotor, said first and second windings being electrically separate and being disposed on the rotor to produce when energised magneto-motive forces whose axes are in different directions, whereby said second winding may be maintained in a condition producing substantially no torque on the rotor, means responsive to the phase relation between the rotor position and the alternating voltage at the stator's terminals to control the magnitude and polarity of the direct current through the first winding so as to provide torque on the rotor in a direction and of a magnitude tending to maintain constant phase relation between the rotor position and the terminal alternating voltage, and means responsive to said alternating voltage and to a reference signal to provide direct current through said second winding in a sense and of a magnitude to enable said stator to generate or absorb reactive power corresponding to the difference between said alternating voltage and said reference.

17. A method as set forth in claim 1 further comprising sensing the phase relation between the angular position of said rotor and an alternating voltage at said stator terminals and thereby developing a first error signal and controlling said direct current through said first winding in accord with said first error signal; and comparing the amplitude of said alternating voltage with a reference to develop thereby a second error signal and controlling said direct current through said second winding in accord with said second error signal.

References Cited

UNITED STATES PATENTS 2,796,580   6/1957   Maggs _____ 322—63 X

ORIS L. RADER, Primary Examiner

H. HUBERFELD, Assistant Examiner

U.S. Cl. X.R.

310—184, 188; 322—63, 64